Figure 1:
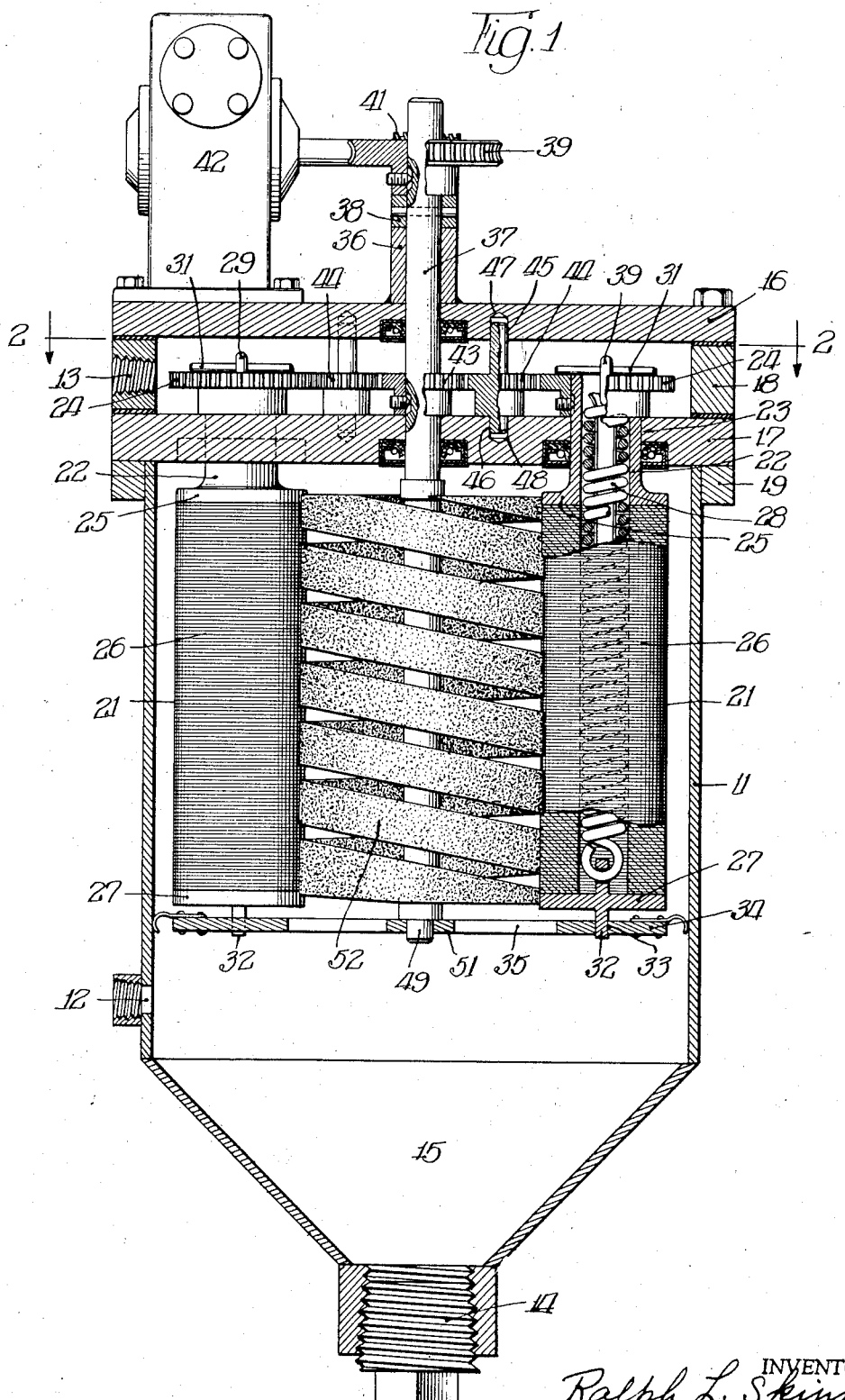

July 18, 1944.  R. L. SKINNER  2,354,150
CLEANABLE FILTER
Filed Sept. 13, 1941  2 Sheets-Sheet 2

INVENTOR.
Ralph L. Skinner
BY Walter M. Fuller
ATTY.

Patented July 18, 1944

2,354,150

UNITED STATES PATENT OFFICE 2,354,150

CLEANABLE FILTER

Ralph L. Skinner, Birmingham, Mich.

Application September 13, 1941, Serial No. 410,755

2 Claims. (Cl. 210—118)

The present invention pertains to filters and it concerns more particularly, but not exclusively, oil-filters each employing a plurality of cylindrical filter elements or packs, each composed of a number of registered, centrally-perforated paper discs or washers held pressed together against one another whereby the filtering action takes place inwardly between the discs and not through them, the discs ordinarily being treated with, or composed of, a substance which precludes the liquid undergoing reclamation from passing through the material of the bodies of the discs.

More or less of the contaminating matter removed from the oil gradually accumulates on the external surfaces of the round filter-packs and, at intervals, such surfaces should be cleaned by wiping or brushing them to remove the clogging material and the instant invention pertains to such a novel means, the leading objects of the invention being the provision of such a device which is relatively simple in structure, which may be provided at comparatively small cost, which is unlikely to become damaged or injured in ordinary service and which is effective and efficient in operation.

To enable those acquainted with this art to understand the invention fully, both from structural and functional standpoints, a present preferred embodiment of the invention has been illustrated in detail in the accompanying drawings and, for simplicity, like reference numerals have been employed to designate the same parts in the two views.

Figure 2:
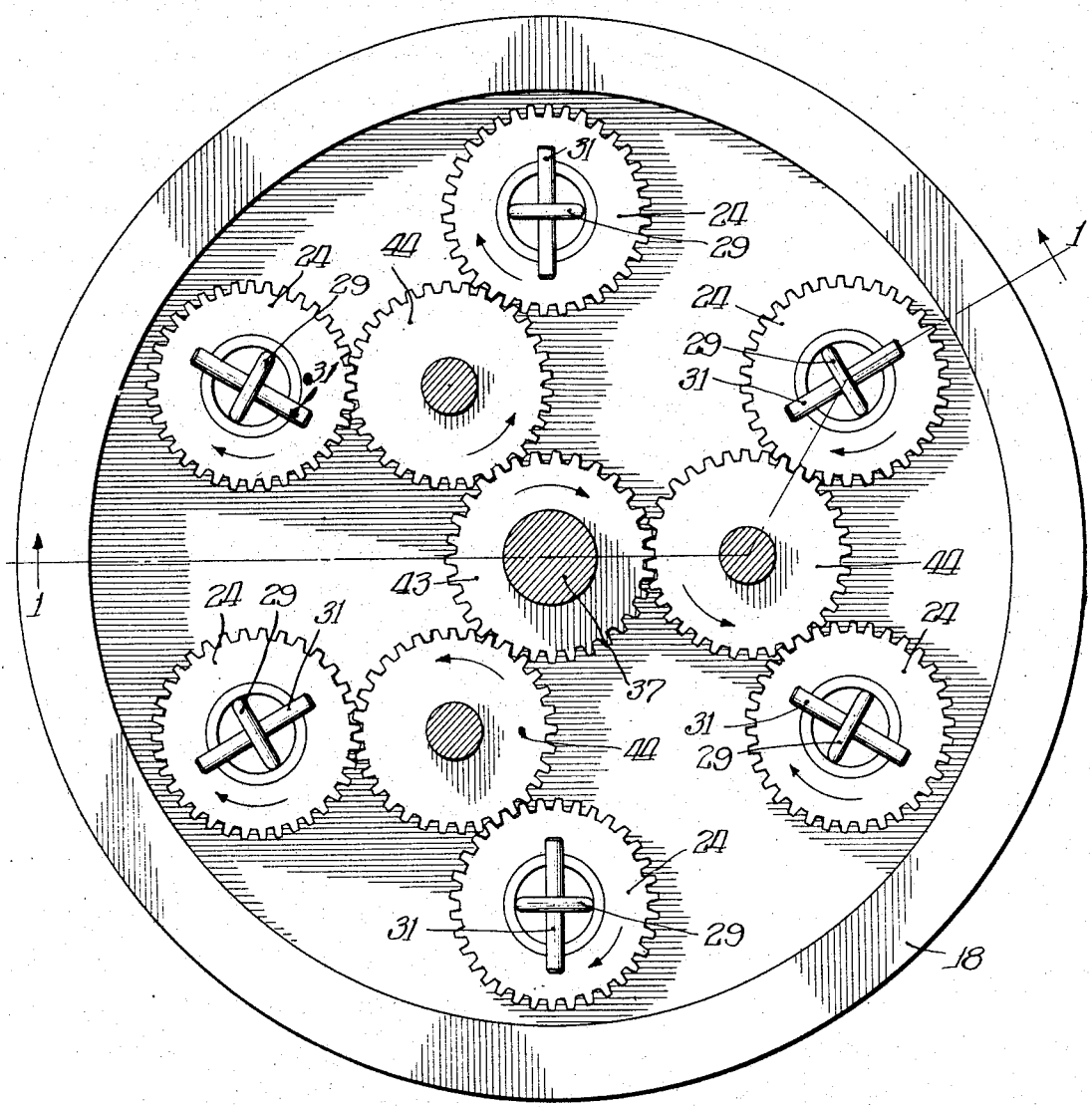

In these drawings:

Figure 1 is a vertical section on a reduced scale through the appliance on line 1—1 of Figure 2; and Figure 2 is a horizontal section on an enlarged scale on line 2—2 of Figure 1.

Referring to the views of such drawings, it will be readily understood that the apparatus includes a tank or casing 11 having a polluted-oil inlet 12 near the lower part of the tank, a filtered-oil outlet 13 at the upper portion of the tank, and a removable-plug drain 14 at the bottom of a conical sludge-basin section 15 constituting the lowest portion of the tank.

Such receptacle 11 has a top-plate 16 closing the upper end thereof and an intermediate-wall plate 17, the two being separated by a ring 18, a supplemental-ring 19 also being employed around the body of the tank just below the plate 17, all of such parts being held together in fixed relation to one another by suitable screws.

Plate 17 supports the group of filter-packs of which six are shown in the present instance, each such filter-assemblage being designated as a whole by the reference-numeral 21.

Each such member 21 at its top is provided with a hollow, metal sleeve or journal 22 occupying and revolvable in an upright-bearing 23 through the plate 17, the upper protruding part of such bearing or sleeve having a spur-gear 24 fixed thereto and by means of which the upright filter-pack, as a whole, may be revolved on its vertical axis.

Below plate 16 the specified rotatable sleeve 22 has an enlargement 25 with a flat or plane horizontal under surface against which the topmost paper or other washer or disc of the stack 26 bears, the lower end of such pile of centrally-apertured paper-discs resting on a bottom metal-plate 27 to which, in any approved manner, the lower end of a long coiled-spring 28 is secured, such spring occupying the interior cylindrical passage through the pack provided by their registered central holes.

This spring extends upwardly through the journal or sleeve 22 and its upper looped end 29 accommodates a cross-pin 31 bearing on the top end of the sleeve, such pin holding the spring under adequate tension to maintain the multiplicity of registered discs or washers pressed together in a manner to accomplish the required effective filtering action.

From what precedes, it will be apparent that the dirty or contaminated oil entering the casing 11 through its inlet 12 under suitable pressure flows inwardly between the discs of the several packs 21 and is filtered in so doing, and, upon leaving the upper ends of the packs, passes out through the outlet 13 for reuse, the contaminating material removed from the oil by the filtering operation in part falling into the sludge-basin 15 from which it may be removed intermittently through the normally-closed drain 14 and in part remaining on the outer surfaces of the several packs.

To clean such external surfaces of the packs from time to time, the following described means has been provided.

Each element 27 has a journal 32 projecting downwardly into a bearing 33 in a guide-plate 34 apertured at 35, such plate being maintained in position in any approved manner in the lower part of the tank as shown.

Thus each such filter-pack is provided at both its upper and lower ends with means allowing its rotation on its axis.

The center of the top of the upper plate 16 has an upstanding-bearing 36 accommodating a central shaft 37 fitted with a collar 38 bearing on the top surface of the member 36, whereby such shaft and the parts which it carries are supported on the bearing by the collar, the shaft above the collar having a driven worm-gear 39 in operative mesh with a driving-worm 41 on the shaft of a gear-reduction mechanism 42 operated by an electric-motor, not shown.

Such upright shaft 37 between the two parallel plates 16, 17 has a gear 43 fixed thereto, the teeth of which are in mesh with those of three equal-size intermediate gears 44, each having journals 45, 46 revolvable in bearings 47, 48 in the plates 16, 17 respectively, the teeth of each such gear 43 in turn being in working mesh with two of the gears 24, 24 of the filter-packs.

At its lower end shaft 37 has a journal 49 rotatable in a bearing 51 in the guide-plate 31, and that portion of the shaft in register with the filter-packs, that is, that section of the shaft between the two plates 17 and 34, is provided with a cylindrical or round brush 52 in which the wiping bristles, fibers or felt or the like are arranged in a downward spiral, the round external surface of the brush being of substantially greater diameter than that of a filter-pack and in contact with the exterior surfaces of all of the six packs.

Thus, when the electric-motor is operated, the brush revolves in one direction, the three intervening gears 44 rotate in the opposite direction, and the six gears 24 and their filter-packs 21 revolve in the same direction as the brush, but since the diameter and surface speed of the brush are greater than those of each pack, the brush wipes the surfaces of all of the packs and discharges the detached sediment downwardly into the sludge-basin.

The sizes of the parts and the gears are such that during the continuance of the cleaning and wiping action, the entire surface of each pack is completely cleaned of all the adhering clogging material and the spiral characteristic of the brush does not tend to contact with a pack in a manner to wipe only one spiral section of its surface.

The packs having been thus brushed clean, the filtering operation then continues with increased efficiency, it being appreciated, of course, that these cleaning operations are resorted to only when the packs require removal of their surface impurities.

The invention, as thus outlined, is obviously not necessarily confined and restricted to the details of construction set forth and various mechanical equivalents may be resorted to without departure from the heart and essence of the invention, as defined by the appended claims, and without the loss or sacrifice of any of the advantages accruing from the employment of the cleaning apparatus.

I claim:

1. In a filter having a casing, a plurality of cylindrical filter-packs of the same diameter in said casing with their axes arranged in a circle and parallel to one another, each said filter-pack including a group of apertured discs, means to hold said discs of each filter-pack together in face-to-face relation with their apertures in register forming an internal passage in the pack, an inlet to admit the fluid to be filtered into said casing outside of said filter-packs, an outlet from said casing communicating with said filter-pack passages for delivery of the filtered fluid from the filter, the filtration occurring through the shallow spaces between said discs, the novel combination of mountings for said packs permitting the packs to rotate on their axes, a round brush of greater diameter than that of said filter-packs having its axis coincident with the center of said circle and parallel to the axes of said filter-packs, a mounting for said brush permitting the brush to rotate about its said axis, the bristles of said brush being arranged in spiral form about said brush axis and engaging the surfaces of said filter-packs, and means to simultaneously rotate said brush and said filter-packs, whereby the brush during such rotation removes the foreign matter from the external surfaces of said filter-packs at least in part longitudinally of the latter.

2. In a filter having a casing, a plurality of cylindrical filter-packs of the same diameter in said casing and with their axes arranged in a circle and parallel to one another, each said filter-pack having an internal passage, an inlet to admit the fluid to be filtered into said casing outside of said filter-packs, an outlet from the casing communicating with said filter-pack passages for delivery of the filtered fluid from the filter, the filtration occurring through the shallow spaces in said packs, the novel combination of mountings for said packs permitting the packs to rotate on their axes, a round brush of greater diameter than that of said filter-packs, having its axis coincident with the center of said circle and parallel to the axes of said filter-packs, a mounting for said brush permitting the brush to rotate about its said axis, the bristles of said brush being arranged in spiral form about said brush axis and engaging the surfaces of said filter-packs, means to rotate all of said filter-packs in the same direction, and means to rotate said brush at a surface-speed greater than that of said filter-packs and in such direction that the portions of the brush in engagement with said filter-packs will travel in the direction the opposite of that of the brush-engaged surfaces of the filter-packs, whereby the brush during such rotation removes the foreign matter from the external surfaces of said filter-packs at least in part longitudinally of the latter.

RALPH L. SKINNER.